United States Patent

[11] 3,582,960

[72] Inventors Edwin H. Hilborn
Framingham;
Ernest E. Gaiser, Waltham, both of, Mass.

[21] Appl. No. 779,169
[22] Filed Nov. 26, 1968
[45] Patented June 1, 1971
[73] Assignee The United States of America as represented by the Administrator of the National Aeronautics and Space Administration

[54] COLOR TELEVISION SYSTEMS USING A SINGLE GUN COLOR CATHODE RAY TUBE
10 Claims, 6 Drawing Figs.

[52] U.S. Cl. .......... 178/5.2R, 178/54PE, 178/54CF
[51] Int. Cl. .......... H04n 9/06
[50] Field of Search .......... 178/5.4 PEN, 5.4 BHN, 5.4, 5.2, 5.4 STC, 5.4 H, 5.4 F, 5.4 RCF, 7.3 DC, 7.1

[56] References Cited
UNITED STATES PATENTS

| | | | |
|---|---|---|---|
| 3,204,143 | 8/1965 | Pritchard | 178/5.4(PEN) |
| 3,330,990 | 7/1967 | Guillette | 178/5.4(PEN) |
| 3,382,317 | 5/1968 | Sandler | 178/5.4(R&W) |

*Primary Examiner*—Robert L. Griffin
*Assistant Examiner*—Richard P. Lange
*Attorneys*—John R. Manning, Herbert E. Farmer and Garland T. McCoy

ABSTRACT: This disclosure describes systems for controlling the three attributes of color (brightness, hue and saturation) in a single-gun, current-sensitive color cathode-ray tube (CRT). Means are provided for modifying standard broadcast signals to permit the reception and display of imagery with this tube, or alternatively, for modifying a monochromatic closed circuit television system to display colored imagery.

The invention described herein was made by employees of the United States Government and may be manufactured and used by or for the Government for governmental purposes without the payment of any royalties thereon or therefor.

COLOR TELEVISION SYSTEMS USING A SINGLE GUN COLOR CATHODE RAY TUBE

BACKGROUND OF THE INVENTION

It is well known that at least three color primaries are necessary in order to display the entire spectrum of visible colors at high saturation, using either additive or subtractive principles. However, since the extremes of the visible spectrum normally occur less frequently than do the intermediate hues, it is possible for a color system to provide pleasing and useful imagery even in the absence of capabilities for displaying deep reds or purples. A number of motion picture processes, notably CINECOLOR, have been commercially successful because they provide pleasing and useful colored imagery simply and cheaply.

Less attention has been paid to the possibilities of using a two-primary system for television. The present broadcast standards are based on a three-primary system, and home receivers presently employ a three gun picture tube, with the individual guns controlled by three separate video amplifiers, to display a color television picture. This requirement, along with the need for an accurately positioned aperture mask and a pattern of dots of the individual phosphor primaries on the tube face results in a picture tube that is highly complex and, therefore, costly to manufacture.

In recent years, a number of CRTs of the "penetron" type have been developed. These cathode-ray tubes have been primarily used for providing color coded information, in graphical or alphanumeric form, for computer readout displays. The tubes typically utilize two or more layers of phosphor, each of which emits different hues; the desired hue is selected by controlling the accelerating voltage of the electrons making up the electron beam so that said beam selectively penetrates the phosphor layers. Because of the high power required when electron beam accelerating voltages are modulated rapidly (typically over the range from 6,000 to 16,000 volts), these tubes do not necessarily represent the best solution to the problem of presenting pictorial quality colored material using a single gun CRT, even though they may be entirely suitable for presenting color-coded statistical information. For this and other reasons described more fully in copending application Ser. No. 642,394, entitled "Luminescent Screen Composition," filed May 31, 1967, the use of a cathode-ray tube wherein color variation is achieved by varying electron beam current rather than accelerating voltage provides an improved means for achieving differential color in a single gun CRT.

While the entire disclosure of copending application Ser. No. 642,394 is incorporated herein by reference, further description of a cathode-ray tube wherein color variation is achieved by varying electron beam current appears desirable. It has been discovered that by mixing in suitable proportions phosphors having different spectral emittances with different curve shapes, different hues may be obtained by variation in beam current. It is thus possible to produce a single-gun cathode-ray tube which emits different colors as a function of electron beam current density while maintaining a constant acceleration voltage. It is possible to achieve the desired color effects with a number of standard phosphor combinations. As is well known, many parameters affect the conversion efficiency of a phosphor. The brightness and color of phosphors depends not only on the specific crystal structure of the chemical compound used, but also on the chemical element or elements used as activator and its (their) percentage in the composition, as well as the chemical elements present as contaminants and their percentage in the composition. The brightness and color of phosphors also depends, among other things, on the firing temperature, length of firing, rate of cooling after firing, particle size, amount and type of grinding, thickness of the coating, temperature of the coating at the time of activation, type and amount of binder present in the coating, rate of phosphorescent decay, type of decay ($e^{1at}$ or $t^{1n}$), and the means for phosphor stimulation.

Attention is directed to the following two tables which set forth some of the applicable phosphors by decay type. In carrying out the invention for a two color system, one phosphor may be selected from the first table and a second phosphor from the second table. However, one or more of the phosphors must be contaminated to reduce its (their) response at low beam currents, i.e., to show a nonlinear characteristic, or other means employed to attain nonlinear current-brightness relationships. In making a selection from the tables, it is suggested that the mixture not only consist of a phosphor from each of the two decay types, but also consist of relatively complementary colors, e.g., R$hbd$1 Al$_2$O$_3$: Cr (0.5) a red phosphor with Hex ZnS : Cu (0.01) a green phosphor. In this combination, by manipulating the green phosphor to make it nonlinear in response, and by limiting the amount of activator for the red phosphor, so that it saturates at moderate current densities, the green predominates at high beam currents and the red at moderate beam currents.

Since the Tables are arranged in order of decay rates, examples would normally be selected having approximately the same positions in the two Tables.

TABLE I

| Structure | Activator | Emission color | Decay in sec.$^{-1}$ |
|---|---|---|---|
| Hex Zn O | Zn | UV and blue green | $10^7$ |
| Rhomb BaSO$_4$ | Pb (1-10) | UV and violet | $10^6$ |
| Tetra CaWO$_4$ | W, Pb (1) | do | $10^5$ |
| Mono Cl Mg$_2$WO$_5$ | W | Pale blue | $10^5$ |
| Cub and Hex ZnS | Mn (2) | Orange | 630 |
| R$hbd$l Al$_2$O$_3$ | Cr (0.5) | Red | 240 |
| Cub Zn Al$_2$O$_4$ | Mn (0.1-2) | Green | 140 |
| R$bhd$l Be$_2$ SiO$_4$ | Mn (0.1-10) | Green to orange-red | 70-120 |
| R$bhd$l Zn$_2$ SiO$_4$ | Mn (0.1-10) | do | 70-120 |
| Tricl Zn$_3$ B$_4$O$_9$ | Mn (1) | Green-yellow | 70 |
| Rhomb Cd SiO$_3$ | Mn (1) | Orange | 40 |
| Monocl Mg SiO$_3$ | Mn (1) | Red and IR | $10^3$-10 |
| Rhomb Cd SO$_4$ | Mn (1) | Yellow-orange | |
| Tetra ZnF$_2$ | Mn (0.1-10) | Orange | 10 |

The above are $e^{1at}$ phosphors, showing decreasing E.

The quantities in parentheses are parts by weight to one part of the phosphor.

TABLE II

| Structure | Activator | Emission color | Decay in sec.$^{-1}$ |
|---|---|---|---|
| Hex CdS | Cd, Ag (0.01) or Cu (0.01) | Red and IR. | Very short to very long. |
| Cub ZnSe | Zn, Ag (0.01) or Cu (0.01) | Orange | Do. |
| Cub ZnS | Am, Ag (0.01) | Blue | Do. |
| Hex ZnS | Cu (0.01) | Green | Do. |
| Tetra ZnF$_2$ | Cb (0.3) | Blue | Do. |
| Ca$_2$ P$_2$O$_7$ | Dy (0.05) | White | Do. |
| Cub SrS | Bi (0.01) | Blue-green | Do. |
| Cub CaS | Bi (0.01) | Violet | Do. |
| Cub SrS | Eu (0.03) and Sm (0.01) | | Do. |

The above are $T^{1n}$ phosphors showing increasing E.

The quantities in parentheses are parts by weight to one part of the phosphor.

In a specific embodiment of the present invention, a phosphor screen is composed of two parts of aluminum oxide, a red producing linear phosphor activated with chromium; and one part of zinc sulfide, a green producing phosphor activated with copper and poisoned with nickel to produce a nonlinear output as a function of beam current.

The phosphor mixture is applied to the inner face of a cathode-ray tube employing conventional settling and decanting techniques. The method set forth in U.S. Pat. No. 1,954,691 is applicable, especially since mixtures of the materials are deposited.

When an electron beam of 1.0 microamperes per square centimeter at 10 kilovolts is applied, the red will predominate. When the electron beam current is increased to 10 microamperes per sq. cm. at 10 kilovolts, the red phosphor saturates while the green component increases.

Since selection of a desired hue with a tube of this type is made by control of the bias on the grid or cathode of the tube (the means normally employed for control of brightness in a monochromatic CRT), other means are required for control of brightness and color saturation in the single gun current sensitive color CRT, hence, direct substitution of the tube into a monochromatic system is not possible.

It is also well known that where field-sequential color is permissible, a closed circuit monochromatic television system may be modified to yield a color presentation by the use of rotating wheels containing color sectors driven synchronously in front of the camera and monitor. While the small color wheel required in front of the camera lens poses no severe mechanical problems, the use of the large color wheel required for a large screen monitor is sufficiently awkward as to make such systems undesirable for widespread use.

It is accordingly an objective of this invention to provide a field sequential color television system having no requirement for a rotating color wheel or similar mechanical means at the monitor.

It is a further objective of this invention to provide a television system capable of presenting pictorial quality color using a single gun current sensitive color cathode ray tube wherein separate control of hue, saturation and brightness of the color primaries is possible.

It is another objective of this invention to provide an apparatus for modifying an existing monochromatic closed circuit television system so that color information can be presented on the screen of a single gun, current sensitive color cathode ray tube.

It is a further objective of this invention to provide an apparatus whereby standard broadcast color transmissions can be received and displayed on a home television receiver employing a single gun, current sensitive color cathode-ray tube.

It is yet another objective of this invention to provide an apparatus for controlling the display of color on a single gun current sensitive color cathode-ray tube by varying electron beam current at substantially constant accelerating voltage.

SUMMARY OF THE INVENTION

In accordance with a principle of this invention, a color television system utilizing a single gun current sensitive color cathode ray tube is provided. Differential color is obtained by varying the current in the electron beam at substantially constant accelerating voltage. Variations in brightness for a given color are achieved by controlling the duty cycle of the electron beam. Because of the normal interlace pattern of two fields per frame, the preferred embodiment of this invention utilizes a two-primary system where each of the two fields of each frame displays one of two primary colors, preferably complementary. Since in a particular picture area, the presence or absence of the second primary determines the saturation (purity) of the first primary, the three attributes of color (hue, saturation and brightness) are thus capable of control.

In accordance with another principle of the invention, the single gun current sensitive color television system of the invention is utilized in a closed circuit television system. The closed circuit system includes a TV camera having a color wheel including two primary colors rotated in front of its optical input. The output from the camera is applied through a brightness-to-duty cycle converter to the grid or cathode of a single gun, current sensitive color cathode-ray tube. Suitable means are provided for switching the amplitude of this signal to different levels for the two fields of each frame, and for synchronizing the speed of rotation of the color wheel with the vertical drive pulse of the system, said pulse also providing the aforesaid switching means with its required signal. The primary colors selected for the color wheel must, of course, match the hues of the primaries produced on the face of the cathode-ray tube by the two current levels selected.

In accordance with a further principle of this invention, a means for converting standard color broadcast transmission signals into signals suitable for application to the grid or cathode of a single gun current sensitive color cathode-ray tube are provided. The system includes means for combining the three color signals of a standard broadcast transmission into two primary color signals. These two signals are converted by a brightness-to-duty cycle converter into a signal suitable for application to the grid or cathode of a single gun current sensitive color cathode-ray tube to control the amplitude and duration of the current at the grid or cathode, thereby controlling the magnitude and the duration of the current pulses in the electron beam.

It will be appreciated by those skilled in the art and others, that the invention is an uncomplicated apparatus for displaying colored pictorial information on a single gun, current sensitive color cathode-ray tube. By controlling electron beam current, hue selection is achieved. Further, by controlling the duty cycle of the electron beam, variations in brightness for a given hue are provided. Consequently, the display has pictorial quality, since both the color and brightness can be controlled and saturation control is accomplished automatically.

The invention is easily utilized in a closed circuit system by providing a conventional monochromatic camera with a color wheel. The color wheel is rotated and the output from the otherwise monochromatic camera is applied to a brightness-to-duty cycle converter. The converter converts the signal into a signal suitable for driving the grid or cathode of a single gun, current sensitive color cathode-ray tube.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
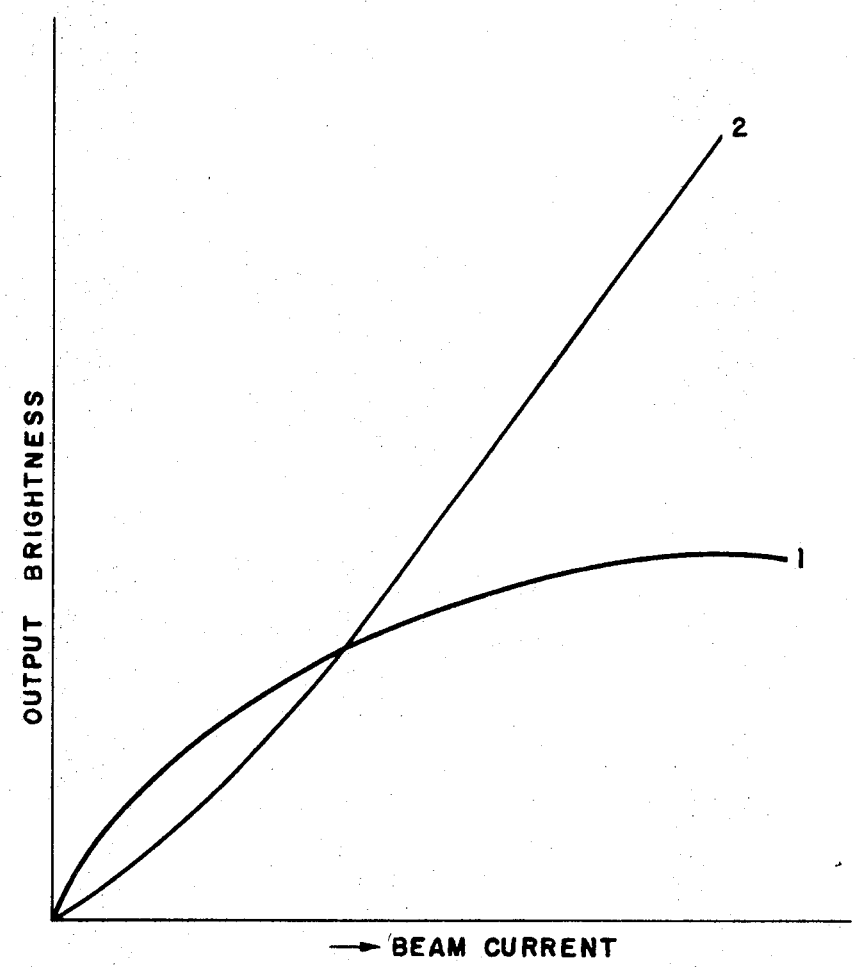
FIG. 1 is a diagram illustrating the current-brightness relationships of the individual phosphor which are mixed to produce a current sensitive, single gun color cathode-ray tube.

FIG. 1 illustrates the principle involved in the production of differential hue from a current-sensitive single gun color cathode ray tube. This principle is described more fully in copending application Ser. No. 642,394, "Luminescent Screen Composition." Generally the tube contains a mixture of phosphors which emit different hues. At least one of the hues has a non linear current-brightness relationship. From FIG. 1, it can easily be seen that at low current levels, the major portion of the emission is from phosphor 1 which may, for illustrative purposes, be a blue-green phosphor. At high current levels, the increased emission from phosphor 2 (which, for illustrative purposes, may be an orange-red phosphor) essentially overpowers the lower emission from phosphor 1, so that the predominant color in this case is orange-red.

Figure 2:
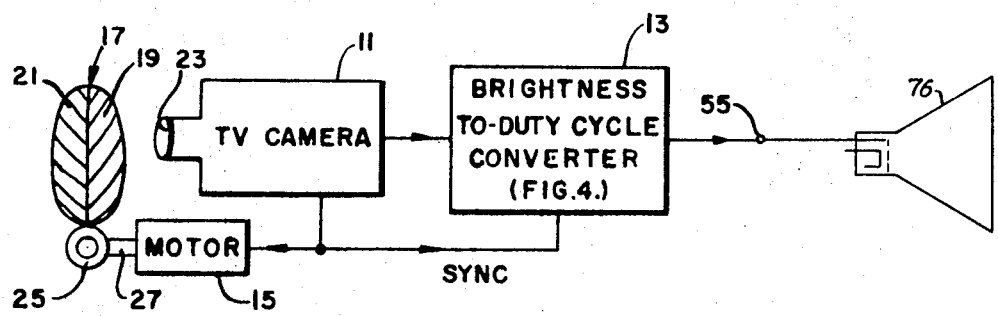
FIG. 2 is a block diagram of a monochromatic closed circuit television system modified by the invention so that color can be presented on a single gun current sensitive color cathode-ray tube.

FIG. 2 illustrates an embodiment of the invention wherein a standard black and white television camera (monochromatic camera) system is modified to provide a color display on a single gun, current sensitive color cathode ray tube containing a phosphor mixture such as that heretofore described with respect to FIG. 1. For simplicity, the various amplifiers, power sources and deflection circuits normally contained in a monochromatic television are not shown, since their existence is well known and they are contained in any standard monochromatic closed circuit television system.

The embodiment of the invention illustrated in FIG. 2 comprises: a monochromatic television camera 11; a brightness-to-duty cycle converter 13; a motor 15; and a color wheel 17. The color wheel 17 is divided into two equal filter sections, 19 and 21, which transmit two different hues. The wheel 17 is rotated in front of the optical input 23 of the monochromatic camera 11 by a suitable drive means 25 connected to the shaft 27 of the motor 15. The filter sections 19 and 21 are selected to pass light of predetermined colors to match the respective output hues available from the picture tube when it is driven at two selected current levels. For example, filter 21 could transmit the red-orange information from a scene and filter 19 the blue-green information from the same scene into the camera. The rotational speed of the motor 15 is controlled by a synchronizing signal derived from camera 11, said sync signal being the vertical retrace signal of the TV camera. Normally, for a conventional system using a 60 Hz. power supply, this signal occurs at a rate of 60 Hz. (the vertical retrace rate), which would require that the color wheel rotate at 30 Hz.

The picture signal from the camera 11 is connected to the input of the brightness-to-duty cycle converter 13. In addition, a vertical retrace sync signal input from the camera 11 is applied to the brightness-to-duty cycle converter 13. As hereinafter described, the picture signal sets the amplitude of the waveform from the brightness-to-duty cycle converter, which is then locked in at specific and different levels throughout the duration of each of the two fields of each frame.

Figure 4:
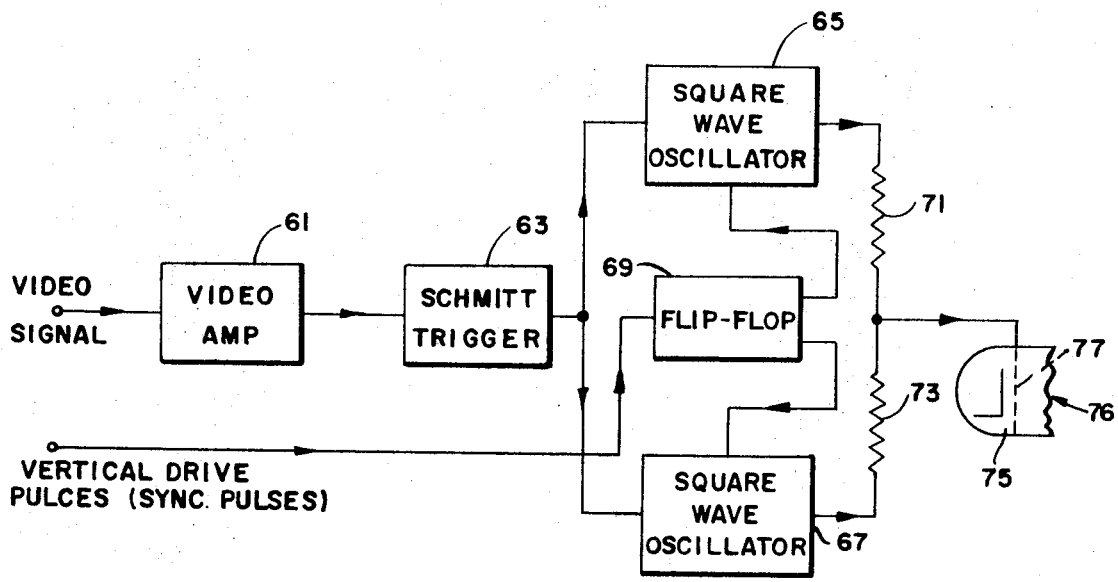
FIG. 4 is a block diagram of a brightness-to-duty cycle converter suitable for use in the embodiment of the invention illustrated in FIG. 2.

In a normal monochromatic television system, the amplitude of the variations of the video signal from the camera 11 eventually control the current level and, therefore, the brightness of the individual elements of the picture displayed on the face of the picture tube. With the current sensitive, single gun color cathode ray tube employed in the instant invention, the level of the electron beam current in the picture tube controls the hue of the picture being displayed. For a given hue, brightness is controlled by varying the duty cycle, and this is a function of the brightness-to-duty cycle converter 13. A brightness-to-duty cycle converter suitable for carrying out these functions is illustrated in FIG. 4 and hereinafter described.

The embodiment of the invention illustrated in FIG. 2 provides a color display in the manner hereinafter described. The wheel 17 is rotated in front of the TV camera 11 to modify the monochromatic signal in accordance with the relative amounts of energy of different wavelengths passing through the respective filters 19 and 21. This signal is converted by the brightness-to-duty cycle converter so that the output signal is adapted to control the current applied to the grid or cathode of the picture tube, which in turn controls the hue of the picture tube for a given field of a frame. Brightness of individual picture elements within the field is controlled by variations in the duty cycle, which is provided by converting the monochromatic signal into a controlled duty cycle signal. Because of the synchronous relationships between the rotational speed of the filter and the switching of signal level within the brightness-to-duty cycle converter, one field of the display provides the information concerning one color primary (e.g., the red-orange) and the second field provides the information concerning the other primary (e.g., the blue-green), so that a composite frame of pictorial quality information results.

Figure 3:
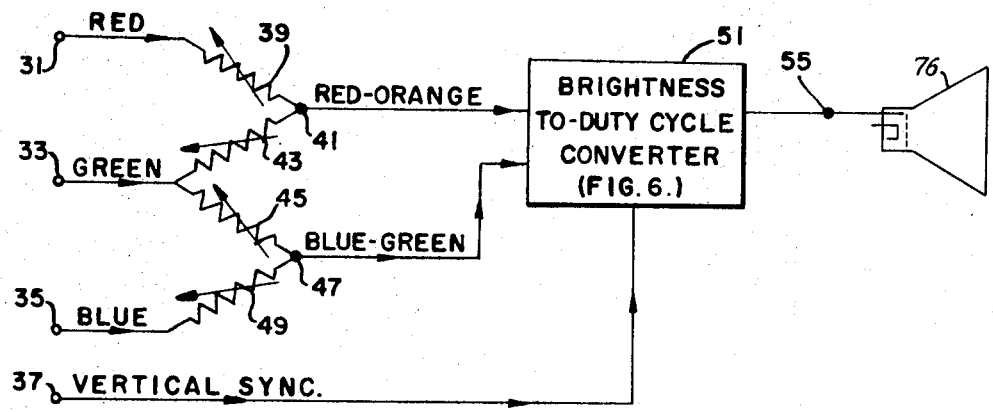
FIG. 3 is a partially schematic and partially block diagram of a portion of a television receiver, modified by the invention so that standard color broadcast signals can be displayed on a single gun, current sensitive color cathode-ray tube.

FIG. 3 depicts an embodiment of the invention wherein conventional color signals are modified so that they can be used to control a color display on the face of a current sensitive single gun color cathode ray tube. In this embodiment of the invention, three signals representing the conventional broadcast transmissions of red, green and blue chrominance information are received at three input terminals 31, 33, and 35. A vertical sync signal is received at an input terminal 37.

The red signal is applied through a variable resistor 39 to a first common point 41. The green signal is also applied through a second variable resistor 43 to the first common point 41. The green signal is also applied through a third variable resistor 45 to a second common point 47. The blue signal is applied through a fourth variable resistor 49 to the second common point 47. Hence, the common points are combinations of the chrominance signals. The first common point is a red-orange signal which is obtained by combining the red and green signals received at the first and second input terminals 31 and 33. The signal at the second common point 47 is a blue-green signal which is a combination of the green and blue inputs received at the second and third terminals 33 and 35. The four variable resistors 39, 43, 45 and 49 permit adjustment of the spectral characteristics of the red-orange primary and the blue-green primary.

Figure 6:
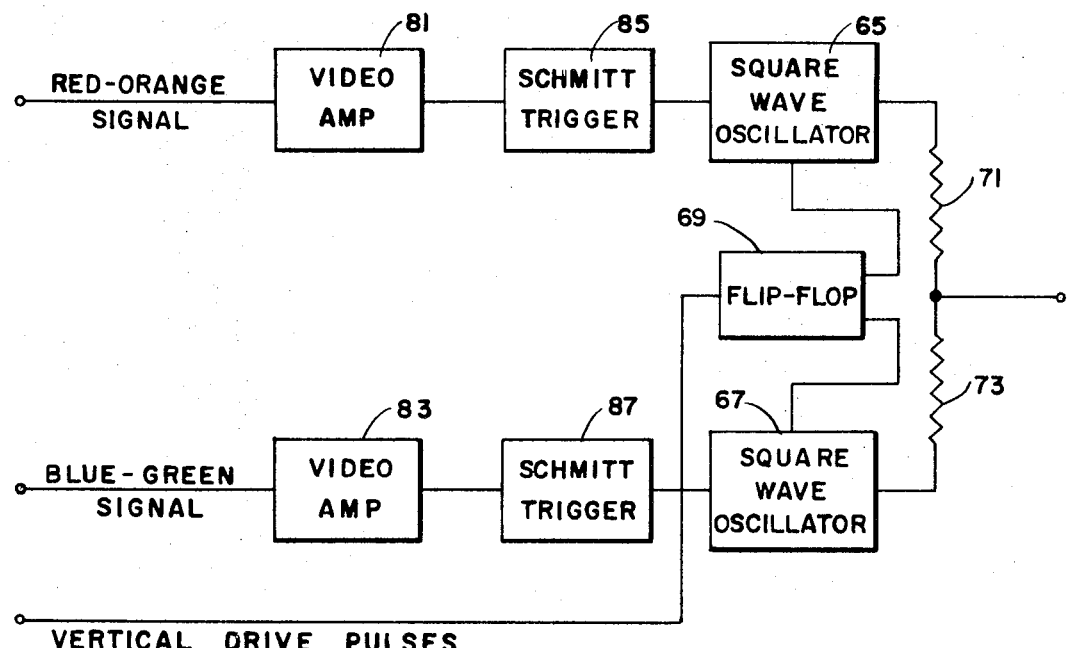
FIG. 6 is a block diagram of a brightness-to-duty cycle converter suitable for use in the embodiment of the invention illustrated in FIG. 3.

The red-orange signal is applied to one input of a brightness-to-duty cycle converter 51 and the blue-green signal is applied to the second input of the brightness-to-duty cycle converter 51. A vertical sync terminal 37 is connected to the sync input of the brightness-to-duty cycle converter 51. The brightness-to-duty cycle converter 51 performs substantially the same function as the brightness-to-duty cycle converter 13 illustrated in FIG. 2. A brightness-to-duty cycle converter suitable for carrying out the functions heretofore described is illustrated in FIG. 6 and hereinafter described. The vertical sync signal received at the fourth input terminal 37 is preferably obtained from the vertical retrace pulse.

The output from the brightness-to-duty cycle converter 51 is connected to an output terminal 55 which is in turn connected to the grid or cathode of the previously described color tube. It is to be understood that suitable amplifiers may be connected to the output terminal 55 to amplify the signal prior to applying it to the grid of the color tube if this signal amplification is necessary.

FIG. 4 is a block diagram of a brightness-to-duty cycle converter suitable for use in the embodiment of the invention illustrated in FIG. 2. The converter illustrated in FIG. 4 comprises a video amplifier 61, a schmitt trigger 63, a first square wave oscillator 65, a second square wave oscillator 67, a flip-flop 69, and first and second resistors 71 and 73.

The incoming video signal is applied through the video amplifier 61 to the input of the schmitt trigger 63. The schmitt trigger's output is connected to the inputs of the first and second square wave oscillators 65 and 67. The vertical drive pulses (sync pulses) are connected to the input of the flip-flop 69. One output of the flip-flop is connected to the control input of the first square wave oscillator 65 and the second output of the flip-flop 69 is connected to the control input of the second square wave oscillator 67. The output of the first square wave oscillator 65 is connected through the first resistor 71 to the grid 77 (or the cathode) of a cathode ray tube partially illustrated at 76. The output of the second square wave oscillator 67 is connected through the second resistor 73 to the grid or cathode of the color tube 76.

Figure 5:
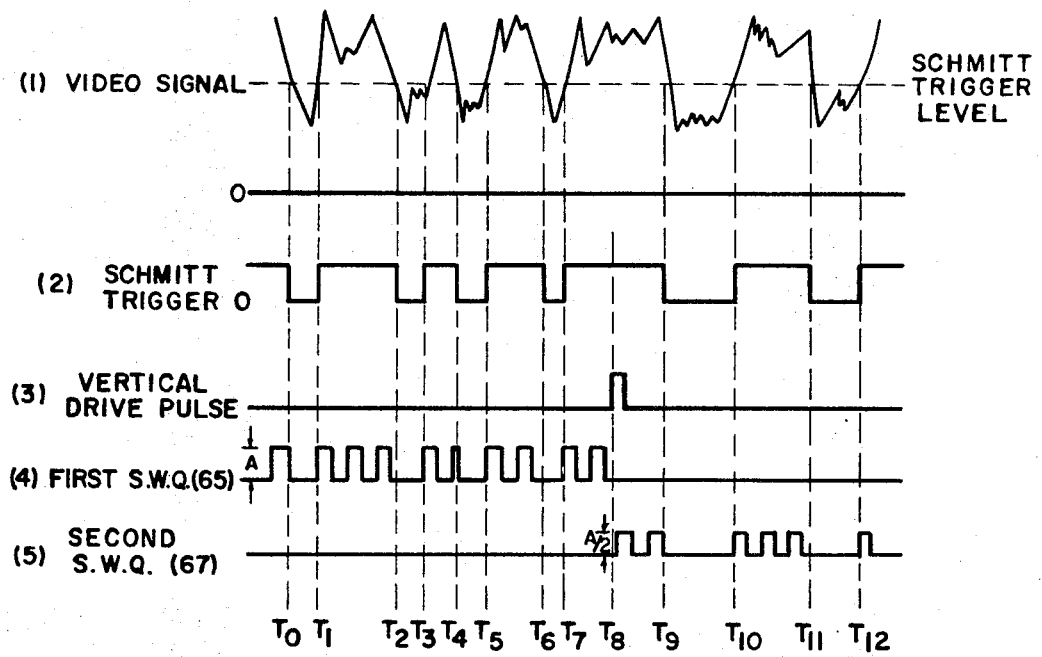
FIG. 5 is a waveform diagram of the signals at specified points in the brightness-to-duty cycle converter illustrated in FIG. 4.

In operation, a video signal of the type illustrated on the first line of FIG. 5 is amplified by the video amplifier 61 and applied to the schmitt trigger 63. When the video signal passes above the triggering level illustrated by the horizontal dashed line, the schmitt trigger generates an output power signal. The schmitt trigger continues to generate an output power signal until the video signal drops below the schmitt trigger level. The schmitt trigger output signal for the video signal illustrated on the first line of FIG. 5 is illustrated on the second line of the same FIG. The vertical drive pulses (on line 3) received by the flip-flop determine the state of the flip-flop, and the state of the flip-flop determines which square wave oscillator, 65 or 67, is operated by the Schmitt trigger output. Specifically, when the flip-flop is in one state, the first square wave oscillator 65 generates an output signal when the schmitt trigger is generating an output signal. Alternatively, when the flip-flop is in its second state, the second square wave oscillator 67 generates an output signal when the schmitt trigger is generating an output signal.

In general, the square wave oscillators generate constant frequency output pulses when they are gated on by the flip-flop 69 and when they are receiving a power signal from the schmitt trigger. As heretofore described, only one square wave oscillator is generating a signal at any particular point in time, i.e., when one is "on," the other is always "off." Lines 4 and 5 of FIG. 5 illustrate the outputs from the square wave oscillators for the video signal input of line 1 and the schmitt trigger output of line 2. Initially, the first square wave oscillator 65 is gated on by the flip-flop 69 and the schmitt trigger is generating a power output signal. Hence, a series of pulses occur. The pulses continue to occur until the video signal drops below the schmitt trigger level and the schmitt trigger output drops to zero. Specifically, prior to time $T_o$, the schmitt trigger is in a power output state; hence, pulses are generated. From $T_o$ to $T_1$, the schmitt trigger is in a zero power output state; hence, no pulses are generated. This power-zero shifting back and forth continues to exist for the first square wave oscillator 65 through time $T_8$. During this period of time (to $T_8$) the second square wave oscillator 67 generates no output pulses.

At $T_8$, a vertical drive pulse occurs (line 3) which switches the state of the flip-flop. When the flip-flop changes states, the first square wave oscillator 65 is gated "off" and the second square wave oscillator 67 is gated "on." Thereafter, from $T_8$ to $T_9$, because the second square wave oscillator is gated on by the flip-flop and because the schmitt trigger 63 is in a power output state, pulses occur at the output of the second square wave oscillator. At $T_9$, the schmitt trigger's output drops to zero; hence, no further pulses are generated. At $T_{10}$, the schmitt trigger's output starts again and from $T_{10}$ through $T_{12}$, pulses are generated. From $T_{11}$ through $T_{12}$, the schmitt trigger output is again zero; consequently, no pulses are generated by the second square wave oscillator 67. At time $T_{12}$, the schmitt trigger starts to generate a power output signal and pulses are again generated.

It should be noted that the level of the pulses from the first square wave oscillator 65 are different from the level of the pulses from the second square wave oscillator 67. It is these voltage differences which eventually produce current differences when they are applied to the grid or cathode of the current sensitive single gun color cathode-ray tube to obtain different hues, for example, blue-green and orange-red. This difference is illustrated in lines 4 and 5 of FIG. 5 by the A-A/2 relationship; i.e., the line 5 signal is at one-half the amplitude of the line 4 signal. This "one-half" difference is exemplary and is not to be considered as limiting.

It will be appreciated from the foregoing description of FIGS. 4 and 5 that the block diagram illustrated in FIG. 4 provides brightness-to-duty cycle functions. The system performs such a function because brightness of the video signal, illustrated on the first line of FIG. 5, determines whether or not the schmitt trigger is to be triggered. That is, the video signal peaks represent bright portions of the video signal, whereas the valleys represent dark portions. Hence, by controlling the trigger level of the schmitt trigger, the level of brightness triggering the schmitt trigger is controlled. And, controlling the "on" and "off" times of the schmitt trigger controls the duration of the output from the oscillators. Finally, controlling the duration of the output from the oscillators controls the brightness of picture elements. In addition, because the level of the oscillator pulses are fixed, one oscillator controls one color (red-orange, for example) and the other controls a second color (blue-green, for example). Hence, two controls — schmitt trigger triggering level and square wave oscillator output level — control both brightness and hue.

FIG. 6 is a block diagram of a brightness-to-duty cycle converter, suitable for use in the embodiment of the invention illustrated in FIG. 3. In general, the brightness-to-duty cycle converter illustrated in FIG. 6 is substantially the same as the brightness-to-duty cycle converter illustrated in FIG. 4. The only difference between the two brightness-to-duty cycle converters is the FIG. 6 embodiment has two channels (one for red-orange signals and the other for blue-green signals), thus requiring first and second video amplifiers 81 and 83 and first and second schmitt triggers 85 and 87 as opposed to a single video amplifier and a single schmitt trigger.

The red-orange signal is applied through the first video amplifier 81 to the input of the first schmitt trigger 85. The output of the first schmitt trigger 85 is connected to the input of the first square wave oscillator 65. The blue-green signal is applied through the second video amplifier 83 to the input of the second schmitt trigger 87. The output of the second schmitt trigger is connected to the input of the second square wave oscillator 67.

The brightness-to-duty cycle converter illustrated in FIG. 6 operates in a manner identical to the brightness-to-duty cycle converter illustrated in FIG. 4. The square wave oscillators 65 and 67 are alternately gated "on" and "off" by the flip-flop 69. The state of the flip-flop is controlled by the vertical drive pulses. The power on or power off states of the schmitt triggers are controlled by the brightness level of the red-orange and blue-green video signals.

It will be appreciated from the foregoing description that the invention provides a system for controlling the display of a color image on the face of a current sensitive, single gun color cathode-ray tube. The hue displayed is controlled by the current of the electron beam and the current of the electron beam is controlled by the outputs of square wave oscillators. The brightness of the color is controlled by the duration of the outputs from the square wave oscillators. By having one hue displayed for one field and a second hue displayed for a second field, a composite color picture is provided.

It will be appreciated by those skilled in the art that the foregoing description has merely presented preferred embodiments of the invention and that numerous modifications can be made therein. For example, pulse code modulation could be employed instead of the pulse duration modulation described herein. Similarly, rather than provide both amplitude (hue) and duration (brightness) signals to a single control element of the picture tube, the hue portion of the signal could provide an adjustment of the cathode bias of the picture tube and the brightness portion of the signal could be applied separately to the grid of the tube. Similarly, if three rather than two primaries are employed, the additional circuitry required to present a different hue every third field rather than every second field is self-evident. Lastly, it should be pointed out that while blue-green and red-orange primaries have been described for illustrative purposes, other combinations are possible, including the use of one hued and one white primary, such that the complement of the hued primary is induced within the visual system of the observer.

What we claim is:

1. A closed circuit color television system comprising:
a black-and-white TV camera;
movable optical filters mounted for movement in front of the optical input of said black-and-white TV camera, said filters comprising a set of at least two discriminably different colors;
moving means connected to said movable filter means for moving said movable filter means, said moving means being controlled by said black-and-white TV camera to bring one of said filters into position synchronously with the scan rate of said camera;
brightness-to-duty cycle converter means for converting the brightness levels of the signals sensed within a scene scanned by said TV camera into variations in duty cycles having an amplitude controlled by the particular filter in front of said camera, said brightness-to-duty cycle means connected to receive a video signal from said TV camera and a vertical retrace signal from said TV camera;
means for varying the amplitude of the brightness-to-duty waveform during successive scans as a function of the particular filter positioned in front of said camera during that portion of the scan; and a single gun current-sensitive color cathode ray tube having one of its electron beam control elements connected to the output of said brightness-to-duty cycle converter means.

2. A closed circuit color television system as claimed in claim 1, wherein said movable filter means is a color wheel having first and second color filtering sections of discriminably different colors and said moving means is a motor having its shaft connected to said color wheel to rotate said color wheel in front of the optical system of the said TV camera within the field of its optical axis at a speed related to the occurrence of the vertical retrace pulses of said TV camera.

3. A closed circuit color television system as claimed in claim 2, wherein said brightness-to-duty cycle converter means comprises:

a video amplifier connected to the video output of said TV camera;

a schmitt trigger connected to the output of said video amplifier;

a first square wave oscillator controlled by said schmitt trigger;

a second square wave oscillator also controlled by said schmitt trigger;

a flip-flop having its input connected to receive vertical retrace pulses from said TV camera, the outputs of said flip-flop connected to control inputs of said first and second square wave oscillators so that the oscillators are alternately switched off and on; and resistor means connected between the outputs of said first and second square wave oscillators and connected to the grid or cathode of said current sensitive single gun color cathode ray tube for applying signals from the output of said first and second square wave oscillators to the grid or cathode of said current sensitive single gun color cathode ray tube.

4. A closed circuit color television system as claimed in claim 3, wherein said first and second square wave oscillators generate output signals having different levels.

5. Apparatus for combining three color chrominance signals into a single signal suitable for application to one of the electron beam control elements of a current sensitive single gun color cathode ray tube comprising:

first means for combining two of said three color signals into a first combined signal;

second means for combining a different two of said three color signals into a second combined signal; and brightness-to-duty cycle converter means connected to said first and second means for converting the brightness of said first and second combined signals into a duty cycle signal, said brightness-to-duty cycle converter means having an input adapted to receive vertical retrace control pulses and output adapted for connection to one of the electron beam control elements of a single gun current sensitive color cathode-ray tube.

6. Apparatus for combining three color chrominance signals into a single signal suitable for application to the grid or cathode of a current sensitive single gun color cathode-ray tube as claimed in claim 5 wherein said brightness-to-duty cycle converter means comprises:

signal amplifier means for receiving said first and second combined signals;

schmitt trigger means connected to said video amplifier means;

square wave oscillator means, having gating inputs for generating output signals related to one or the other of said combined signals controlling said schmitt trigger means;

flip-flop means adapted to receive said vertical drive retrace control pulses and connected to the gating inputs of said square wave oscillator means, for controlling the generation of signals by said square wave oscillator means; and combining means connected to the output of said square wave oscillator means for combining the output of said square wave oscillator means.

7. Apparatus for combining three chrominance signals into a single signal suitable for application to the grid or cathode of a current sensitive single gun color cathode-ray tube as claimed in claim 6 wherein the said square wave oscillator means generate output signals having different levels.

8. A brightness-to-duty cycle converter comprising:

video amplifier means for amplifying a video signal;

schmitt trigger means connected to said video amplifier means for generating an output signal when the output from said video amplifier means is above a predetermined level;

square wave oscillator means having a gating input and a power input, said power input connected to the output of said schmitt trigger means, for generating an output signal when the output from said video amplifier means is above a predetermined level;

square wave oscillator means having a gating input and a power input, said power input connected to the output of said schmitt trigger means, for generating output oscillations;

flip-flop means adapted to receive control pulses connected to the gating input of said square wave oscillator means for controlling the gating of said square wave oscillator means.

9. A brightness-to-duty cycle converter as claimed in claim 8, wherein said square wave oscillator means comprises first and second square wave oscillators having their gating inputs connected to separate outputs of said flip-flop means so that said first and second square wave oscillators are alternately gated on and off.

10. A brightness-to-duty cycle converter as claimed in claim 9, wherein said first and second square wave oscillators generate output signals having different levels.